(12) United States Patent
Otto

(10) Patent No.: US 6,732,923 B2
(45) Date of Patent: May 11, 2004

(54) RADIO FREQUENCY IDENTIFICATION SYSTEM AND METHOD

(75) Inventor: Jerome A. Otto, Centerville, OH (US)

(73) Assignee: NCR Corporation, Dayton, OH (US)

( * ) Notice: Subject to any disclaimer, the term of this patent is extended or adjusted under 35 U.S.C. 154(b) by 400 days.

(21) Appl. No.: 09/826,065

(22) Filed: Apr. 4, 2001

(65) Prior Publication Data

US 2002/0145036 A1 Oct. 10, 2002

(51) Int. Cl.[7] .............................................. G06K 15/00
(52) U.S. Cl. ....................... 235/383; 235/385; 235/449; 235/487; 340/10.4; 340/10.42; 340/572.7; 340/825.73
(58) Field of Search ................................ 235/383, 385, 235/375, 449, 450, 492, 435, 487; 340/572.1, 572.2, 572.4, 572.5, 572.7, 10.1, 10.3, 10.4, 10.42, 10.51, 825.73

(56) References Cited

U.S. PATENT DOCUMENTS

| | | | |
|---|---|---|---|
| 4,816,824 A | | 3/1989 | Katz et al. .............. 340/825.34 |
| 5,001,458 A | * | 3/1991 | Tyren et al. .......... 340/572.5 X |
| 5,151,684 A | | 9/1992 | Johnsen ........................ 340/572 |
| 5,206,495 A | | 4/1993 | Kreft ............................ 235/492 |
| 5,218,189 A | | 6/1993 | Hutchison .................... 235/439 |
| 5,239,167 A | | 8/1993 | Kipp ........................... 235/383 |
| 5,313,192 A | | 5/1994 | Ho et al. ..................... 340/551 |
| 5,444,223 A | | 8/1995 | Blama ......................... 235/435 |
| 5,481,102 A | * | 1/1996 | Hazelrigg, Jr. .............. 235/487 |
| 5,533,061 A | | 7/1996 | Smith et al. ................. 375/334 |
| 5,583,819 A | * | 12/1996 | Roesner et al. ........... 340/10.51 |
| 5,604,485 A | * | 2/1997 | Lauro et al. ............. 340/572.5 |
| 5,649,295 A | | 7/1997 | Shober et al. .............. 455/38.2 |
| 5,680,106 A | | 10/1997 | Schrott et al. ............... 340/572 |
| 5,818,348 A | | 10/1998 | Walczak et al. ........ 340/825.54 |
| 5,874,902 A | | 2/1999 | Heinrich et al. ....... 340/825.54 |
| 5,939,984 A | | 8/1999 | Brady et al. ............. 340/572.1 |
| 5,952,922 A | | 9/1999 | Shober ..................... 340/572.4 |
| 5,966,082 A | | 10/1999 | Cofino et al. .......... 340/825.54 |
| 6,018,299 A | | 1/2000 | Eberhardt ................. 340/572.7 |
| 6,019,394 A | | 2/2000 | Chenoweth et al. .......... 283/81 |
| 6,040,773 A | | 3/2000 | Vega et al. .............. 340/572.1 |
| 6,091,332 A | | 7/2000 | Eberhardt et al. ....... 340/572.1 |
| 6,094,138 A | | 7/2000 | Eberhardt et al. ....... 340/572.1 |
| 6,100,026 A | | 8/2000 | Nova et al. ..................... 435/6 |
| 6,104,311 A | * | 8/2000 | Lastinger ................. 340/10.51 |
| 6,107,920 A | | 8/2000 | Eberhardt et al. ....... 340/572.7 |
| 6,107,921 A | | 8/2000 | Eberhardt et al. ....... 340/572.7 |
| 6,121,878 A | | 9/2000 | Brady et al. ............. 340/572.1 |
| 6,130,613 A | | 10/2000 | Eberhardt et al. ....... 340/572.7 |
| 6,147,605 A | | 11/2000 | Vega et al. .............. 340/572.7 |
| RE37,956 E | * | 1/2003 | Blama ........................ 235/435 |

FOREIGN PATENT DOCUMENTS

WO    WO 96/13793    * 5/1996

* cited by examiner

Primary Examiner—Jared J. Fureman
(74) Attorney, Agent, or Firm—Paul W. Martin; Maginot, Moore & Beck LLP

(57) ABSTRACT

A radio frequency (RF) identification system and method which rely on the presence or absence of unique frequency signals. The system includes an RF interrogator which transmits signals at a plurality of different frequencies and which receives first frequencies of the plurality of different frequencies from an item label, and a computer which determines second frequencies of the plurality of different frequencies which were not received by the RF interrogator, and which determines an item identification number from the first and second frequencies by assigning first values equal to a first binary value to first data bits occupying first data bit positions in the item identification number for the first frequencies and assigning second values equal to a second binary value to second data bits occupying second data bit positions in the item identification number for the second frequencies.

12 Claims, 4 Drawing Sheets

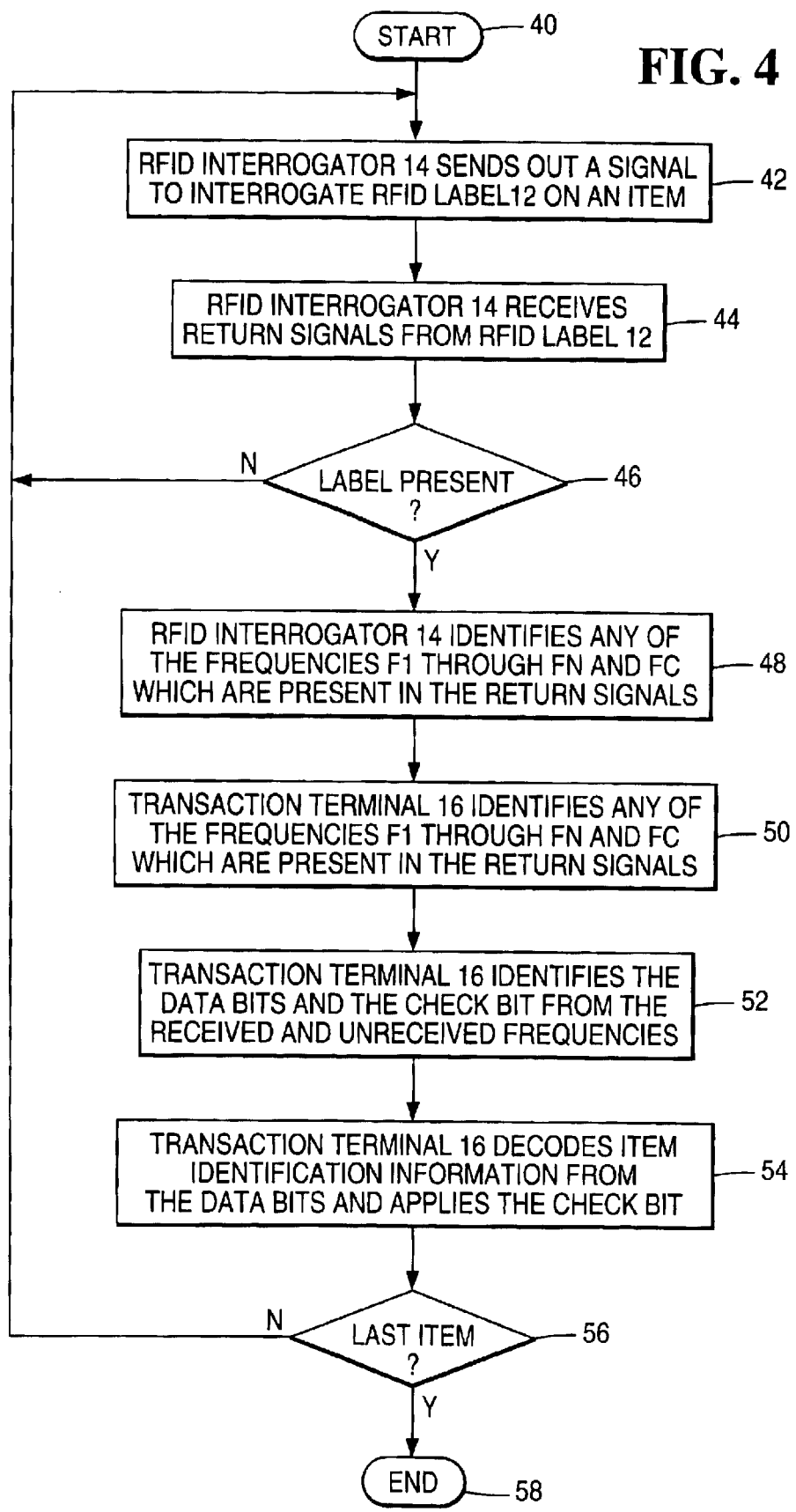

RADIO FREQUENCY IDENTIFICATION SYSTEM AND METHOD

BACKGROUND OF THE INVENTION

The present invention relates to checkout systems, and more specifically to a radio frequency identification (RFID) system and method.

RFID technology provides an alternative to bar code reader technology for distinguishing and recording items for purchase. RFID may result in labor savings to retailers, since it may obsolete conventional methods of identifying items.

Some of the uses of RFID technology are disclosed in U.S. Pat. No. 6,019,394 assigned to the assignee of the present invention. This patent is hereby incorporated by reference.

RFID systems generally include single bit systems, memory systems, and intelligent systems.

Single bit systems include single bit labels. A single bit label includes a tuned antenna. The antenna passively reflects a specific frequency RF signal and an RFID reader detects the reflected signal. The RFID label can signal only two states to the reader: "RFID in the field" and "no RFID in the field". This type of label has been used on clothing security tags.

Memory systems include labels with an antenna and a memory. The memory stores information such as store name, article price, and purchase date. An RFID reader reads the information without having to get near the label. The RFID system may also add to the information on the chip. Power for the memory may be obtained from the RF signal itself.

Intelligent systems include labels with a memory, antenna, and computer. Intelligent labels can provide additional functionality helpful to a consumer. Power may be obtained from a battery or from the article, if it is powered. An electronic price label, such as the one manufactured by the assignee of the present invention, may act as an intelligent RFID label.

Generally speaking, increased functionality results in an increase in cost and complexity, with the single bit label being the least complex and least costly. Printed ink antennas have driven down the cost. These antennas are not only less costly than metal antennas, but they are also easier to apply to different types of materials.

Though inexpensive, single bit labels are not useful for distinguishing one item from another. Therefore, it would be desirable to provide an RFID system and method, which is inexpensive yet, conveys item identification number.

SUMMARY OF THE INVENTION

In accordance with the teachings of the present invention, a radio frequency identification (RFID) system and method is provided.

According to one embodiment of the invention, the system comprises an RF interrogator which transmits signals at a plurality of different frequencies and which receives first frequencies of the plurality of different frequencies from an item label, and a computer which determines second frequencies of the plurality of different frequencies which were not received by the RF interrogator, and which determines an item identification number from the first and second frequencies by assigning first values equal to a first binary digit to first data bits occupying first data bit positions in the item identification number for the first frequencies and assigning second values equal to a second binary digit to second data bits occupying second data bit positions in the item identification number for the second frequencies.

A method of identifying an item includes the steps of transmitting a plurality of different first signals having a plurality of different frequencies, receiving second signals having second frequencies from an item label associated with the item, determining third frequencies associated with the item label which were not received from the item label, and determining an item identification number from the second and third frequencies, including the substeps of assigning first values equal to a first binary digit to first data bits occupying first data bit positions in the item identification number for the second frequencies, and assigning second values equal to a second binary digit to second data bits occupying second data bit positions in the item identification number for the third frequencies.

It is accordingly an object of the present invention to provide a radio frequency identification (RFID) system and method.

It is another object of the present invention to provide a system and method of identifying items which requires less item orientation and placement in order to identify items.

It is another object of the present invention to provide an inexpensive method of identifying items for purchase.

It is another object of the present invention to supplement or replace the function of barcodes with multiple single bit RFID labels.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

FIG. 4 is a flow diagram illustrating the method of the present invention.

DETAILED DESCRIPTION OF THE PREFERRED EMBODIMENT

Figure 1:
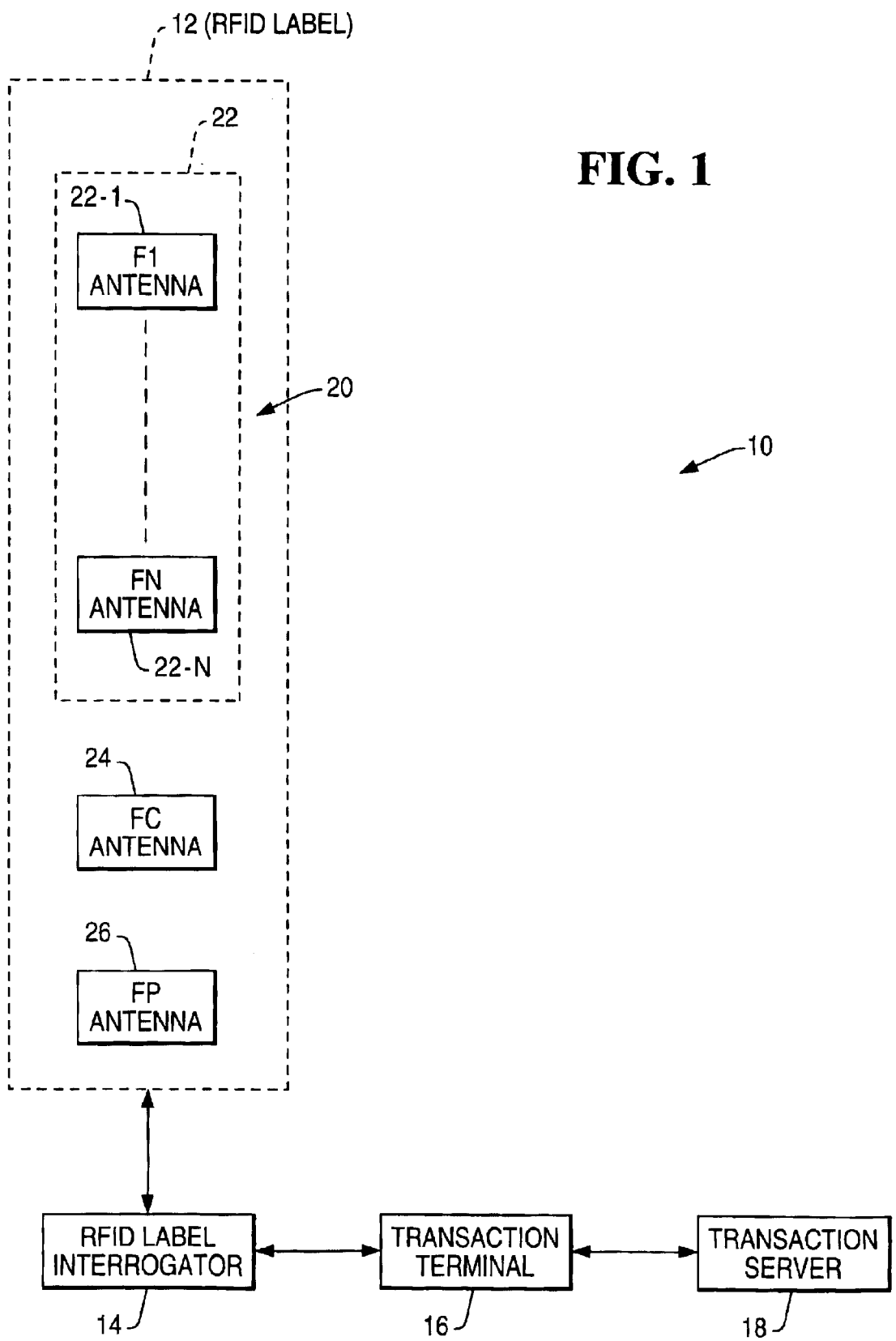
FIG. 1 is a block diagram of a transaction processing system.

Referring now to FIG. 1, one embodiment of transaction system 10 primarily includes radio frequency identification (RFID) label 12, RFID label interrogator 14, transaction terminal 16, and transaction server 18.

Figure 2:
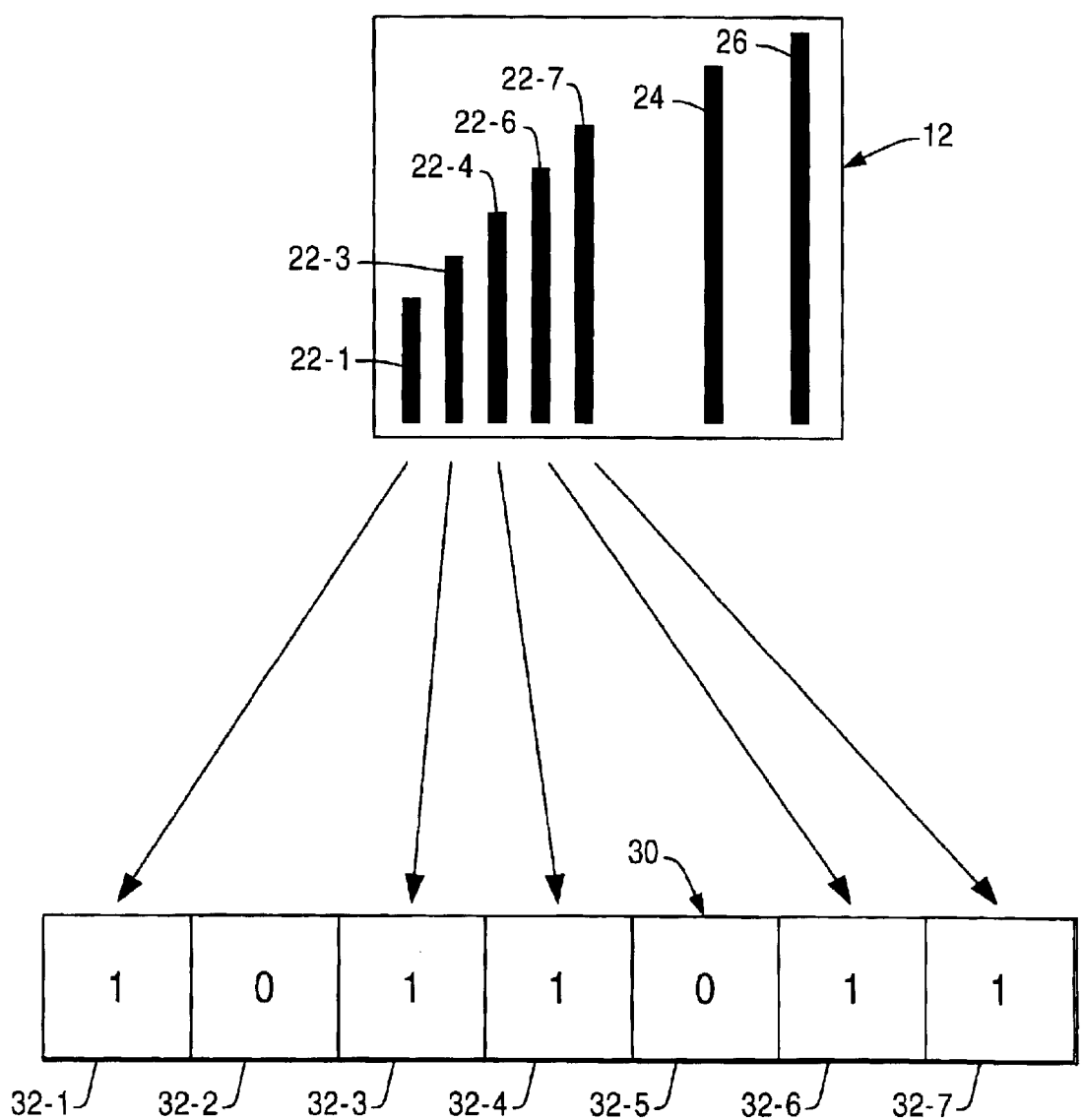
FIG. 2 is a representation of an example RFID label in accordance with the principles of the present invention.

RFID label 12 includes a plurality of passive, tuned antennas 20. A first group 22 of antennas 20 produces data bit signals. The data bits are mapped into data bit positions 32 of a binary item identification number (FIG. 2). Antennas 22-1 through 22-N are tuned at frequencies $f_1$ through $f_N$.

Antenna 24 communicates a check bit to ensure data from antennas 22 have been properly received. Antenna 24 is tuned at frequency $f_c$, which is different from frequencies $f_1$ through $f_N$. A plurality of check bits may also be employed at unique frequencies $f_{C1}$ through $f_{CM}$, where M is the number of check bits.

Antenna 26 communicates a label present bit which indicates that RFID label 12 is within range of RFID label interrogator 14. Antenna 26 is tuned at frequency $f_p$, which are different from frequencies $f_1$ through $f_N$ and $f_c$.

Antennas 20 may be printed ink antennas or conventional metal antennas, depending on the item. For example, printed ink antennas would be as cost effective and as easy to apply to some items as barcodes. Printed ink antennas would be suitable for use on clothing tags and item packaging. Conventional metal antennas may be used on items such as appliances.

RFID labels 12 may vary in size, depending upon item size, and may be visible or hidden when attached to items. RFID label 12 may be removably or permanently attached to items.

RFID interrogator 14 emits a signal and receives return signals from nearby RFID labels 12. RIFD interrogator 14 receives return signals from antennas 20. RFID interrogator 14 preferably includes a number of RF transceivers.

Data bits may be detected by detecting the presence or absence of return signals at antennas 20 at frequencies $f_1$ through $f_N$ in binary fashion. Reception of any of frequencies $f_1$ through $f_N$ by corresponding tuned antennas 22-1 through 22-N represents a first binary digit. Lack of reception of any of frequencies $f_1$ through $f_N$ by corresponding tuned antennas 22-1 through 22-N represents a second binary digit. For example, reception of a frequency may represent a binary value of "1" (one), while non-reception of a frequency may represent a binary value of "0" (zero).

Similarly, reception or lack of reception of frequencies $f_c$ and $f_p$ by antenna 24 represents one or the other of two binary values. For example, reception or lack of reception of frequencies $f_c$ or $f_p$ by antennas 24 or 26 may represent bits of "1" or "0".

Transaction server 18 handles price requests from transaction terminals 16 and maintains price information.

Transaction terminal 16 uses RFID interrogator 14 to read RFID labels 12, one at a time. Transaction terminal 16 sends item identification number from RFID labels 12 to server 18 with price requests. After receiving price information for the items from server 18, transaction terminal 16 completes a sale of the items by accepting payment.

Turning now to FIG. 2, an example RFID label 12 is illustrated.

Frequencies $f_1$ through $f_7$ are associated with data bit positions 32-1 through 32-7 of item identification number 30.

In this example, only antennas 22-1, 22-3, 22-4, 22-6, 22-7, 24, and 26 are present. Their lengths are related to their frequencies.

RFID label interrogator 14 receives signals from antennas 22-1, 22-3, 22-4, 22-6, and 22-7. Transaction terminal 16 interprets the received signals as data signals from RFID label 12 since a signal at frequency $f_p$ is also received.

Transaction terminal 16 assigns data bits equal to "1" to the assigned data bit positions 32-1, 32-3, 32-4, 32-6, and 32-7. Transaction terminal 16 interprets a lack of received signals at frequencies $f_2$ and $f_5$ as an indication that data bits equal to "0" should be assigned to data bit positions 32-2 and 32-5.

Since frequency $f_c$ is also received, transaction terminal 16 applies a check bit equal to "1" to the received data bits.

Transaction terminal 16 is programmed with a mapping of frequencies to data bit positions so that received data bits may be properly positioned relative to one another to correctly form item identification number 30.

While antennas 20 are arranged in parallel lines, they may be arranged in other ways to obtain acceptable reception. While antennas 22-1, 22-3, 22-4, 22-6, and 22-7 are arranged in order of size, they may be arranged in other ways as well.

Figure 3:
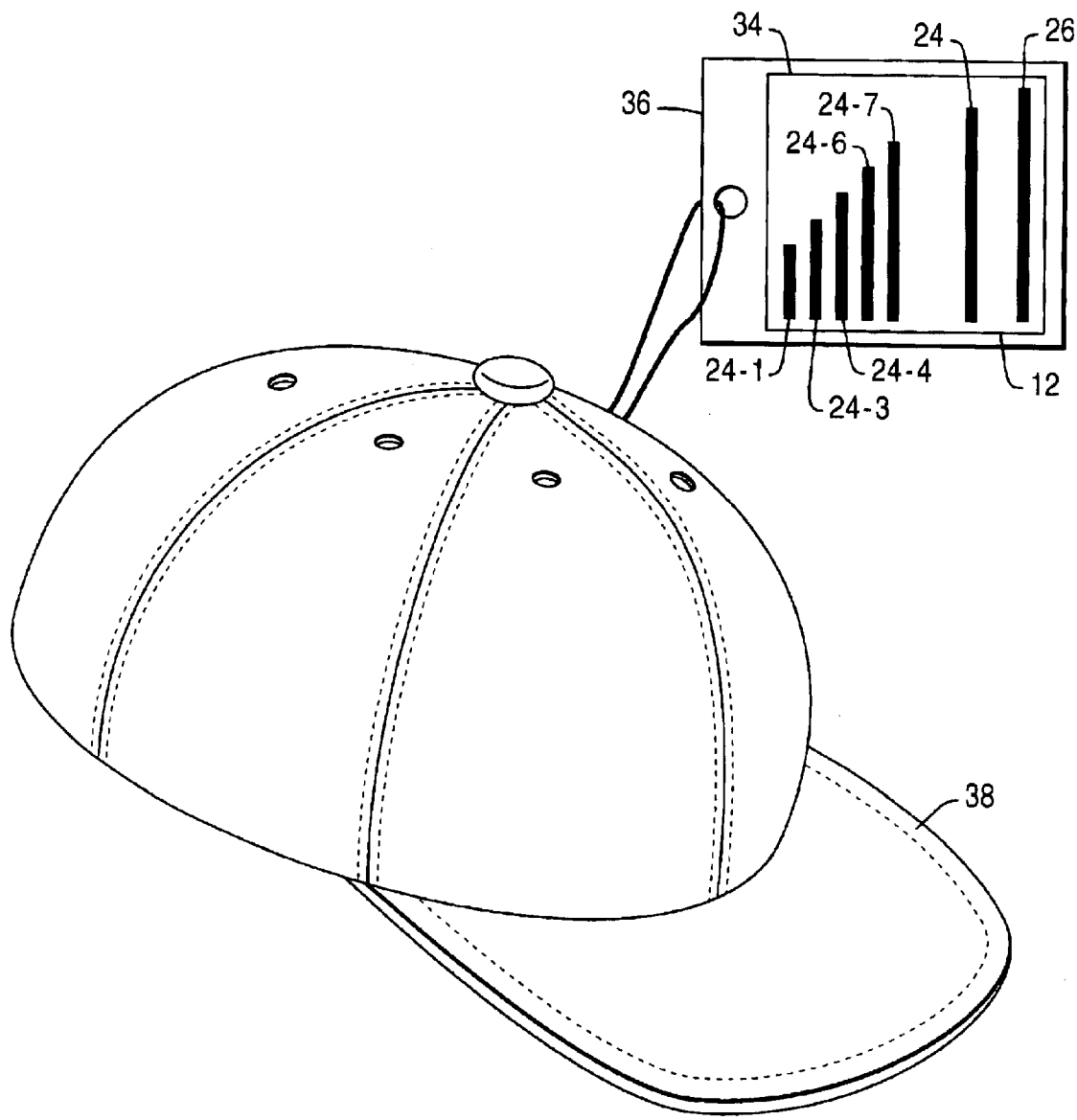
FIG. 3 is a perspective view of an example application for the RFID label of the present invention.

Turning now to FIG. 3, an example application of the RFID label 12 of FIG. 2 is illustrated.

RFID label 12 is printed on an adhesive label 34 and applied to clothing tag 36. Clothing tag 36 is attached to cap 38.

In FIG. 4 the method of operation of system 10 is illustrated in more detail beginning with START 40.

In step 42, RFID interrogator 14 sends out a signal to interrogate RFID label 12 on an item. The signal may be sent in response to an operator command or trigger or by a signal from a proximity sensor, similar to barcode readers.

In step 44, RFID interrogator 14 receives return signals from RFID label 12.

In step 46, RFID interrogator 14 determines whether one of the signals is at frequency $f_p$, which would indicate that an RFID label has been interrogated and is present. If so, operation proceeds to step 48. Otherwise, RFID interrogator 14 provides an error indication and operation returns to step 42.

In step 48, RFID interrogator 14 identifies any of frequencies $f_1$ through $f_N$ and $f_c$ which are present in the return signals, indicative of a "1" for those bits, and passes the frequency information to transaction terminal 16.

In step 50, transaction terminal 16 identifies any of frequencies $f_1$ through $f_N$ and $f_c$ which are not present in the return signals, indicative of a "0" for those bits.

In step 52, transaction terminal 16 identifies the data bits and the check bit from the received and unreceived frequencies.

In step 54, transaction terminal 16 decodes item identification number from the data bits and applies the check bit. Transaction terminal 16 forwards the item identification number to transaction server 18 with a price request.

In step 56, operation returns to step 42 to interrogate additional RFID labels 12 on other items or, if no more items remain, operation ends at step 58.

Although the present invention has been described with particular reference to certain preferred embodiments thereof, variations and modifications of the present invention can be effected within the spirit and scope of the following claims.

I claim:

1. A method of identifying an item comprising the steps of:
   transmitting a plurality of different first signals having a plurality of different frequencies;
   receiving second signals having second frequencies from an item label associated with the item, each second frequency corresponding to a known data bit position of an N-bit item identification number associated with the item;
   determining third frequencies associated with the item label which were not received from the item label, each third frequency corresponding to another known data bit position of the N-bit item identification number associated with the item; and
   determining the N-bit item identification number from the second and third frequencies, including the substeps of
   assigning first values equal to a first binary value to each known data bit position of the N-bit item identification number for the second frequencies; and
   assigning second values equal to a second binary value to each known data bit position of the N-bit item identification number for the third frequencies.

2. The method as recited in claim 1, further comprising the steps of:
  receiving a fourth signal having a fourth frequency from the item label; and
  determining from receipt of the fourth signal that the second signals were from the item label.

3. A method of identifying an item comprising the steps of:
  interrogating antennas associated with the item which are tuned to first frequencies of a plurality of different frequencies;
  receiving the first frequencies, each received first frequency corresponding to a known data bit position of an N-bit item identification number associated with the item;
  determining second frequencies of the plurality of different frequencies, each determined second frequency corresponding to another known data bit position of the N-bit item identification number associated with the item; and
  determining the N-bit item identification number for the first and second frequencies, including the substeps of
    assigning first values equal to a first binary value to each known data bit position of the N-bit item identification number for the first frequencies; and
    assigning second values equal to a second binary value to each known data bit position of the N-bit item identification number for the second frequencies.

4. A method of identifying an item comprising the steps of:
  interrogating antennas affixed to the item as part of an item label;
  receiving first different frequencies associated with the item label which were not received, each first frequency corresponding to a known data bit position of an N-bit item identification number associated with the item;
  determining second different frequencies from the antennas each determined second frequency corresponding to another known data bit position of the N-bit item identification number associated with the item; and
  determining the N-bit item identification number from the first and second frequencies, including the substeps of
    assigning first values equal to a first binary value to each known data bit position of the N-bit item identification number for the first frequencies; and
    assigning second values equal to a second binary value to each known data bit position of the N-bit item identification number for the second frequencies.

5. A method of identifying an item comprising the steps of:
  interrogating antennas;
  receiving a plurality of different first frequencies from the antennas;
  determining from a second frequency of the first frequencies that the antennas are associated with an item label;
  determining third frequencies equal to a remainder of the first frequencies;
  determining fourth frequencies associated with the item label which were not received; and
  determining an item identification number from the third and fourth frequencies, including the substeps of
    assigning first values equal to a first binary value to first data bits occupying first data bit positions in the item identification number for the third frequencies; and
    assigning second values equal to a second binary value to second data bits occupying second data bit positions in the item identification number for the fourth frequencies.

6. A method of identifying an item comprising the steps of:
  establishing a mapping of a plurality of different frequencies to a plurality of different data bit positions in an item identification number;
  interrogating antennas affixed to the item as part of an item label;
  receiving only first frequencies of the plurality of different frequencies;
  determining second frequencies equal to a remainder of the plurality of different frequencies; and
  determining the item identification number from the first and second frequencies, including the substeps of
    assigning first values equal to a first binary value to first data bits occupying first data bit positions in the item identification number for the first frequencies; and
    assigning second values equal to a second binary value to second data bits occupying second data bit positions in the item identification number for the second frequencies.

7. A method of identifying an item comprising the steps of:
  transmitting a plurality of different signals at a plurality of different frequencies;
  receiving a first signal having a first frequency;
  receiving second different signals having second different frequencies;
  determining from receipt of the first signal that the first and second signals were reflected from antennas of an item label;
  determining first data bit signals in the second different signals having first data bit signal frequencies;
  determining second data bit signals having second data bit signal frequencies which were not received from the item label; and
  determining an item identification number from the first and second data bit signal frequencies, including the substeps of
    assigning first values equal to a first binary value to first data bits occupying first data bit positions in the item identification number for the first data bit signal frequencies; and
    assigning second values equal to a second binary value to second data bits occupying second data bit positions in the item identification number for the second data bit signal frequencies.

8. The method as recited in claim 7, further comprising the steps of:
  determining a check bit signal in the second different signals having a check bit signal frequency;
  assigning a check bit value of one to a check bit; and
  applying the check bit to the item identification number resulting from the first and second data bits.

9. The method as recited in claim 7, further comprising the steps of:
  determining a check bit signal having a check bit signal frequency which was not received from the item label;
  assigning a check bit value of zero to a check bit; and
  applying the check bit to the item identification number resulting from the first and second data bits.

10. A radio frequency (RF) identification system comprising:

an RF interrogator which transmits signals at a plurality of different frequencies and which receives first frequencies of the plurality of different frequencies from an item label, each first frequency corresponding to a known data bit position of an N-bit item identification number; and a computer which determines second frequencies of the plurality of different frequencies which were not received by the RF interrogator, each second frequency corresponding to another data bit position of the N-bit item identification number, and which determines the N-bit item identification number from the first and second frequencies by assigning first values equal to a first binary value to each known data bit position of the N-bit item identification number for the first frequencies and assigning second values equal to a second binary value to each known data bit position of the N-bit item identification number for the second frequencies.

11. A radio frequency (RE) item identification system comprising:

an RF interrogator which transmits first signals at a plurality of different first frequencies and which receives second signals at second frequencies including a third signal at a third frequency;

a computer which determines from the third signal that the second signals are from an item label, which determines fourth signals at fourth frequencies associated with the item label that were not received by the RF interrogator, and which determines an item identification number from the second and fourth frequencies by assigning first values equal to a first binary value to first data bits occupying first data bit positions in the item identification number for the second frequencies and assigning second values equal to a second binary value to second data bits occupying second data bit positions in the item identification number for the fourth frequencies.

12. A radio frequency (RF) item identification system comprising:

an RF interrogator which interrogates antennas affixed to the item as part of an item label and which receives first signals having first frequencies; and a computer which establishes a mapping of a plurality of different frequencies including the first frequencies to a plurality of different data bit positions in an item identification number, which determines second signals having second frequencies within the plurality of different frequencies that were not received by the RF interrogator, and which determines the item identification number from the first and second frequencies by assigning first values equal to a first binary value to first data bits occupying first data bit positions in the item identification number for the first frequencies and by assigning second values equal to a second binary value to second data bits occupying second data bit positions in the item identification number for the second frequencies.

* * * * *